(12) United States Patent
Fujita

(10) Patent No.: US 6,215,996 B1
(45) Date of Patent: Apr. 10, 2001

(54) MOBILE COMMUNICATION SYSTEM

(75) Inventor: Kosaku Fujita, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/126,406

(22) Filed: Jul. 30, 1998

(30) Foreign Application Priority Data

Jul. 31, 1997 (JP) .................................................. 9-206665

(51) Int. Cl.[7] .............................. H04Q 7/20; H04B 1/38; H04M 1/00
(52) U.S. Cl. ......................... 455/422; 455/422; 455/403; 455/428; 455/436; 455/560; 455/445
(58) Field of Search .................................. 455/403, 422, 455/436, 560, 428, 461, 465; 370/465, 466, 328

(56) References Cited

U.S. PATENT DOCUMENTS

| | | | |
|---|---|---|---|
| 5,515,397 | * 5/1996 | Wiorek ................................. | 455/403 |
| 5,608,779 | * 3/1997 | Lev et al. ............................. | 455/436 |
| 5,768,308 | * 6/1998 | Pon et al. ............................. | 455/560 |
| 5,956,673 | * 9/1999 | Weaver, Jr. et al. ................. | 455/436 |
| 5,987,327 | * 11/1999 | Lev et al. ............................. | 455/560 |
| 6,138,022 | * 10/2000 | Strawczynski et al. ............. | 455/445 |

FOREIGN PATENT DOCUMENTS

| | | |
|---|---|---|
| 62-123843 | 6/1987 | (JP) . |
| 63-285059 | 11/1988 | (JP) . |
| 6-244933 | 9/1994 | (JP) . |

OTHER PUBLICATIONS

Abstract of Japanese Patent 2–194740, Relaying System for Non–Telephonic Signal, Hitoshi Komagata, Nippon Telegr & Teleph Corp., Aug. 1, 1990.

Japanese Office Action issued Apr. 28, 1999 in a related application.

* cited by examiner

Primary Examiner—Daniel Hunter
Assistant Examiner—Meless N Zewdu
(74) Attorney, Agent, or Firm—Ostrolenk, Faber, Gerb & Soffen, LLP

(57) ABSTRACT

A mobile communication system in which a calling terminal transmits coding attribute identification information, and called terminal identification information to a central during call initiation. The coding attribute identifies the compression and coding process used by the calling terminal. A paging request generated by the central switching station is then addressed to the called terminal. The called terminal's response includes coding attribute information identifying its compression and coding process. If the coding and compression processes of the two terminals are the same, communication is conducted without conversion to PCM format. The audio signals transmitted by the calling and called terminals are continuously converted to PCM format at the associated base stations, but if the compression and coding processes of the participating terminals are the same, the unconverted audio signals (with coding attribute identification added) are transmitted. If the compression and coding processes do not match, the PCM signals are transmitted. At each base station, the incoming audio signals pass through PCM-to-native-format code converters. If the coding attribute identification is present in the incoming signal (indicating that the compression and coding processes of the two terminals match), the incoming unconverted audio signal is transmitted to the associated terminal. If the attribute identification is absent, the code converted signal is transmitted.

20 Claims, 5 Drawing Sheets

MOBILE COMMUNICATION SYSTEM

BACKGROUND OF THE INVENTION

1. Field of the Invention

The present invention relates to a mobile communication system, in particular, to a CODEC system for use with a base-station controlling unit.

2. Description of the Related Art

FIG. 5 shows a digital mobile communication system according to a first example of the prior art. Here, when a mobile terminal 1a calls a mobile terminal 1b, a CODEC 41a of a base-station controlling unit 3a code-converts audio data of the mobile terminal 1a through a base station 2a into PCM audio data regardless of the attributes of, audio data of the mobile terminal 1a and the mobile terminal 1b. The base-station controlling unit 3a transmits the PCM audio data to a mobile-terminal switching station 5. The mobile-terminal switching station 5 transmits the PCM audio data received from the base-station controlling unit 3a to a base-station controlling unit 3b that accommodates the mobile terminal 1b on the called side. A CODEC 41b of the base-station controlling unit 3b code-converts the PCM audio data received from the mobile-terminal switching station 5 into the audio data with the attributes of the mobile terminal 1b. The base-station controlling unit 3b transmits the resultant audio data to the mobile terminal 1b through a base station 2b.

In this first related art reference, regardless of the attributes of audio data of the mobile terminal 1a on the calling side and the attributes of audio data of the mobile terminal 1b on the called side, the base-station controlling unit 3a on the calling side and the base-station controlling unit 3b on the called side perform a code-converting process one time each (a total of two times).

Next, a second related art reference will be described. In the second related art reference, assuming that a mobile terminal transmits non-audio data such as FAX data to a terminal of the telephone network or another mobile terminal, a code-converting (CODEC) process is performed. When a mobile terminal transmits FAX data to a remote terminal, the mobile terminal on the calling side sets the communication mode to a FAX mode. However, at this point, the mobile terminal on the calling side determines whether the current mode thereof is an audio (telephone) mode or a non-audio (FAX) mode and notifies a relevant base station of the determined mode to the determined result. When the base station has received the notification that communication data is nonaudio data from the mobile terminal, the base station connects the communication data to a non-audio interface other than the audio CODEC interface so as to accomplish a non-audio communication with the terminal on the called side.

In other words, an object of the second related art reference is to simplify hardware of a base station in such a manner that a mobile terminal determines whether or not the current mode is audio data mode or non-audio data mode.

Next, the problems of the above-described related art references will be described.

In the first related art reference, when the attributes of audio data of the mobile terminal 1a on the calling side are the same as the attributes of audio data of the mobile terminal 1b on the called side, the base-station controlling unit 3a on the calling side code-converts audio data (with the attributes common in the mobile terminal 1a and the mobile terminal 1b) into PCM audio data. The base-station controlling unit 3b on the called side code-converts the PCM audio data code-converted by the base-station controlling unit 3a on the calling side into original audio data (with the attributes common in the mobile terminal 1a and the mobile terminal 1b).

Thus, although the attributes of audio data of the mobile terminal 1a on the calling side are the same as the attributes of audio data of the mobile terminal 1b on the called side, since the code-converting process is performed twice, the delay time of is audio data becomes large. In addition, the quality of audio data deteriorates.

The second related art reference is limited to non-audio (FAX) data communications. Further, In the second related art reference, since a mobile terminal requires a data type determining circuit that determines whether data transmitted therefrom is audio data or non-audio data and a circuit that notifies a base station of the determined result, the additional circuitry increases the size of the mobile terminal.

SUMMARY OF THE INVENTION

An object of the present invention is to decrease the delay time of audio data being communicated between the mobile terminal 1a on the calling side and the mobile terminal 1b on the called side, to prevent the quality of audio data from deteriorating, and to accomplish such effects in a simpler call connecting sequence than before when the attributes of audio data of the mobile terminal 1a on the calling side are the same as the attributes of audio data of the mobile terminal 1b on the called side.

Another object of the present invention is to accomplish a simple method for monitoring audio data of two parties that are communicating with each other.

The present invention is a mobile communication system having a mobile-terminal switching station, a base-station controlling unit on the calling side, a base-station controlling unit on the called side, a base station, and mobile terminals, wherein the mobile-terminal switching station has a means for identifying attributes of audio data transmitted by the mobile terminal on the calling side and attributes of audio data of the mobile terminal on the called side, in the case and for prohibiting the base-station controlling unit on the calling side from transmitting a code-converting audio data when the attributes of the audio data of both mobile terminals are the same wherein the base-station controlling unit on the calling side has a means for selecting a first path of over which audio data received from the base station is output to the mobile-terminal switching station through a code-converting process or a second path of over which audio data received from the base station is output to the mobile-terminal switching station without a code-converting process, and a means for adding audio attribute information to audio data received from the base station, and wherein the base-station controlling unit on the called side has a means for identifying the audio attribute information added to the audio data received from the mobile-terminal switching station, and a means for selecting a first path over which audio data is output to the base station through a code-converting process or a second path over which audio data is output to the base station without code-converting process corresponding to the identified results.

The mobile terminal on called side has a means for identifying attributes of audio data of the mobile terminal on calling side and attributes of audio data of the mobile terminal on called side, and a means for prohibiting the base-station controlling unit on calling side from transmitting the code-converted audio data in the case that the attributes of the audio data of the mobile terminal on calling side match the attributes of the audio data of the mobile terminal on called side.

The base-station controlling unit on calling side has a means for prohibiting the base-station controlling unit on called side from transmitting the code-converted for audio data in the case that the attributes of the audio data of the mobile terminal on calling side match the attributes of the audio data of the mobile terminal on called side.

An audio monitor unit for monitoring audio data is connected to the mobile-terminal switching station, wherein the audio monitor unit has a means for identifying audio attribute information added by the base-station controlling unit to audio data being communicated between the mobile terminal on calling side and the mobile terminal on called side, and a means for determining whether or not the code-converting process for the audio data is required corresponding to the identified results, and wherein the audio monitor unit monitors audio data of the mobile terminal on calling side and audio data of the mobile terminal on called side, the mobile terminal on calling side and the mobile terminal on called side communicating in a CODEC-through manner.

These and other objects, features and advantages of the present invention will become more apparent in light of the following detailed description of a best mode embodiment thereof, as illustrated in the accompanying drawings.

DESCRIPTION OF PREFERRED EMBODIMENTS

Figure 1:
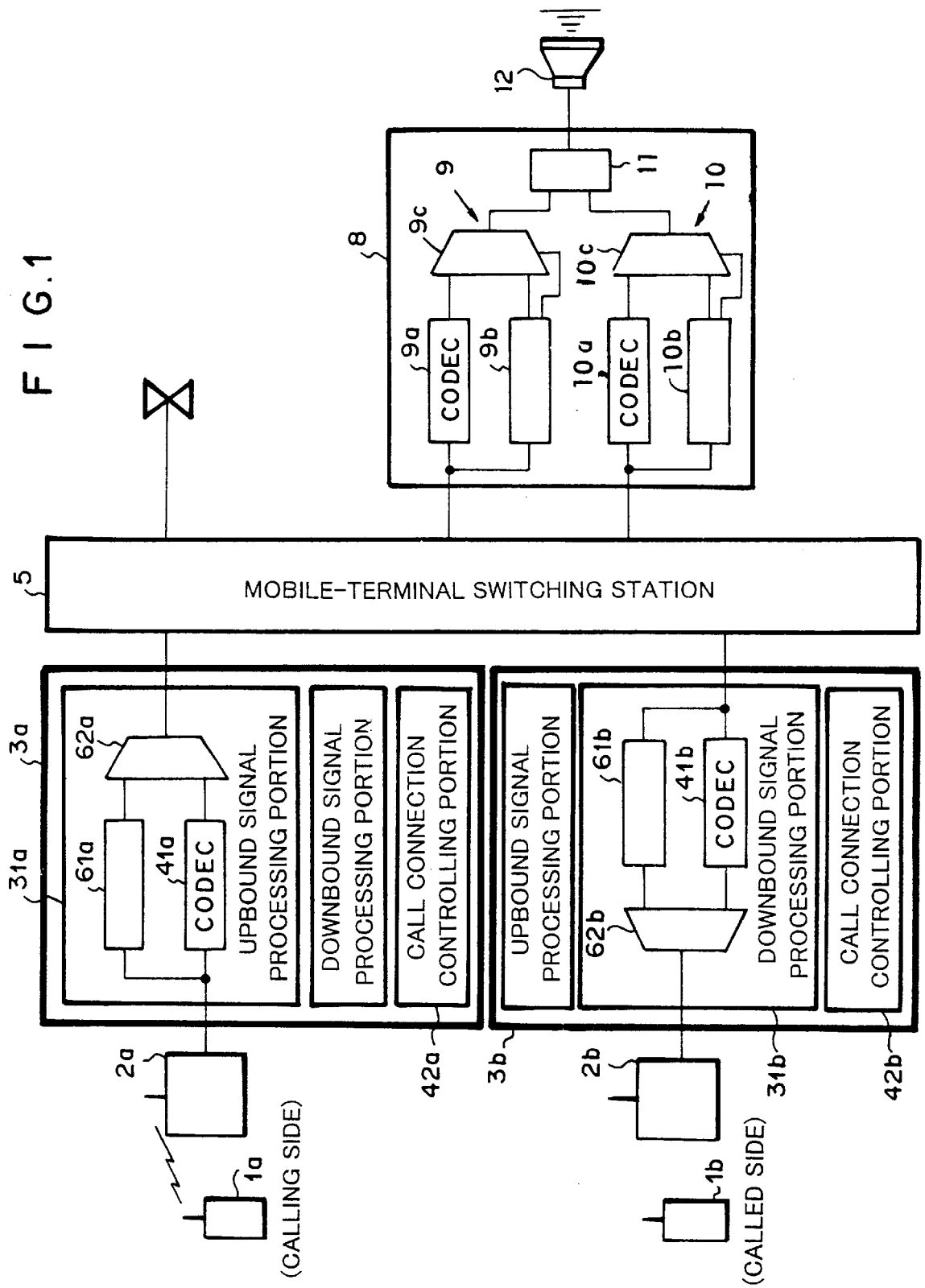
FIG. 1 is a block diagram showing the structure of a CODEC-through system according to an embodiment of the present invention.
Figure 2:
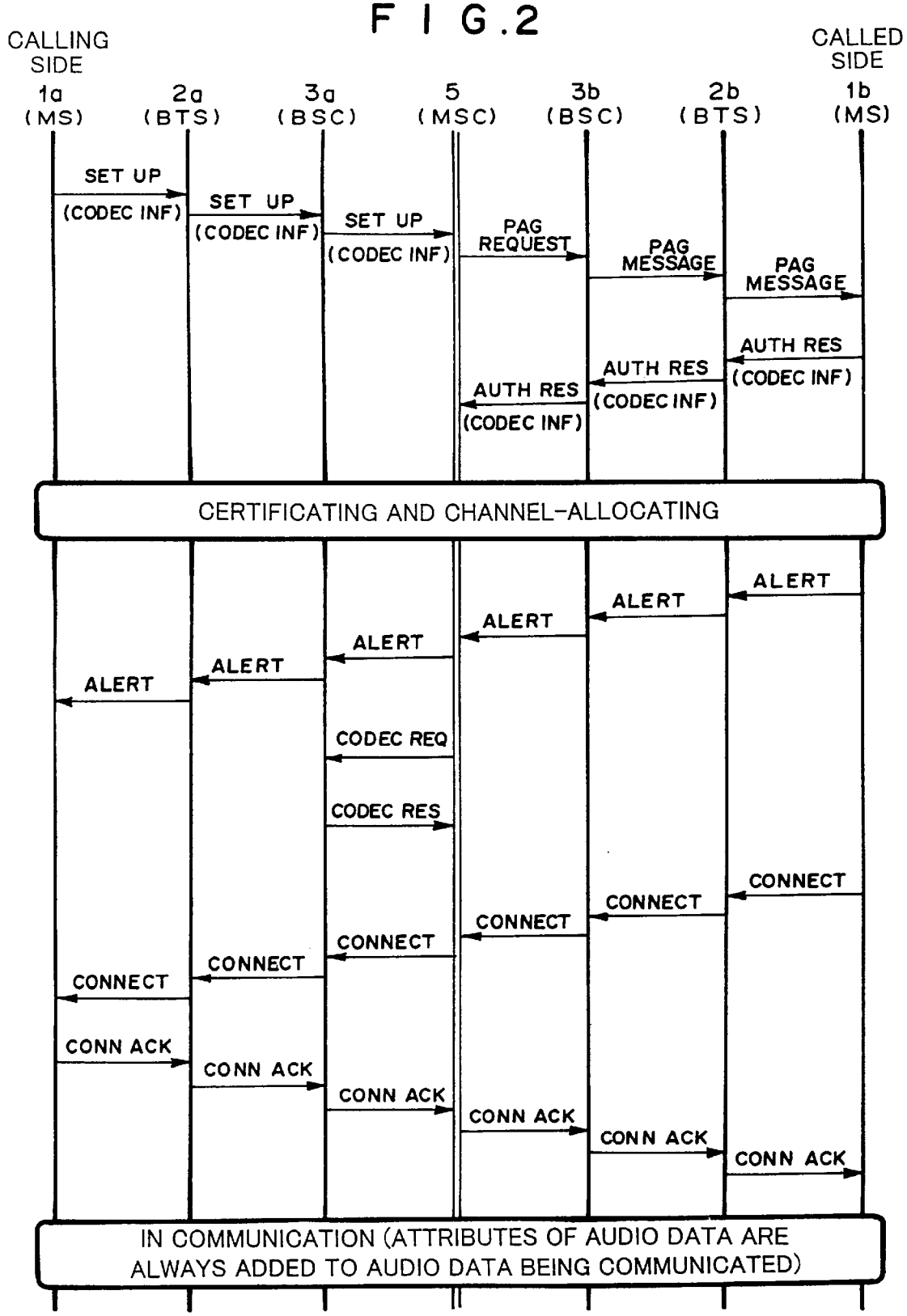
FIG. 2 is a schematic diagram showing a first example of a call connecting sequence according to the present invention.

Next, with reference to FIGS. 1 and 2, an embodiment of the present invention will be described. FIG. 1 is a block diagram showing the structure of an embodiment of the present invention. As shown in FIG. 1, a CODEC-through system according to the embodiment comprises mobile terminals 1a and 1b, base stations 2a and 2b, base-station controlling units 3a and 3b, and a mobile-terminal switching station 5.

The base-station controlling units 3a and 3b each comprise an upbound signal processing portion 31a, a downbound signal processing portion 31b, and call connection controlling portions 42a and 42b. The upbound signal processing portion 31a comprises a CODEC 41a, an audio type information adding portion 61a, and an audio data selecting portion 62a. The downbound signal processing portion 31b comprises a CODEC 41b, an audio data type determining portion 61b, and an audio data selecting portion 62b. An audio data monitoring unit 8 comprises a CODEC 9a, an audio data type determining portion 9b, an audio data selecting portion 9c, an adding portion 9d, and an audio data outputting portion 9e.

The CODECs 41b and 9a code-convert audio data into PCM audio data or vice versa corresponding to VSELP, QCELP, or PSI-CELP system.

Next, the operation of the CODEC-through system according to the embodiment will be described. When the mobile terminal 1a calls the mobile terminal 1b, the mobile-terminal switching station 5 performs a call connection controlling process therebetween. In other words, the mobile-terminal switching station 5 determines the attributes of audio data of the mobile terminals 1a and 1b. When the attributes of audio data of the mobile terminal 1a match the attributes of audio data of the mobile terminal 1b, the mobile-terminal switching station 5 issues a command for prohibiting to transmission of code-converted the audio data to the base-station controlling unit 3a that accommodates the mobile terminal 1a on the calling side.

In the case of a TDMA communication system, audio data of a mobile terminal is transmitted corresponding to VSELP or PSI-CELP system. In the case of a CDMA communication system, audio data of a mobile terminal is transmitted corresponding to QCELP system.

Next, the operation of the base-station controlling unit 3a on the calling side will be described. The command issued by the mobile-terminal switching station 5 is transmitted to the call connection controlling portion 42a of the base-station controlling unit 3a. When the call connection controlling portion 42a has received the command from the mobile-terminal switching station 5, the call connection controlling portion 42a notifies the audio data type information adding portion (hereinafter referred to as adding portion) 61a of the fact that the attributes of audio data of the mobile terminal 1a on the calling side match the attributes of audio data of the mobile terminal 1b on the called side and of the attributes thereof. In addition, the call connection controlling portion 42a notifies the audio data selecting portion 62a of the fact that the attributes of audio data of the mobile terminal 1a on the calling side match the attributes of audio data of the mobile terminal 1b on the called side. When the adding portion 61a has received the notification from the call connection controlling portion 42a, the adding portion 61a adds audio attribute information notified by the call connection controlling portion 42a to audio data received from the base stations 2a and outputs the resultant data to the audio data selecting portion 62a.

Next, the operation of the upbound signal processing portion 31a of the base-station controlling unit 3a will be described. Audio data corresponding to VSELP or PSI-CELP system received from the base station 2a is sent to both the CODEC 4'a and the adding portion 61a of the upbound signal processing portion 31a. The CODEC 41a code-converts audio data received from the base station 2 into PCM audio data regardless of the attributes of the audio data received therefrom and outputs the PCM audio data to the audio data selecting portion 62a. When the adding portion 61a has received the notification that the attributes the audio data of the mobile termipal 1a on the calling side match the attributes of audio data the mobile terminal 1b on the called side, the adding portion 61a adds audio attribute information (of three bits) to the audio data received from the base station 2a. However, the adding portion 61a does not code-convert the audio data.

When the adding portion 61a has not received the notification from the call connection controlling portion 42a, the adding portion 61a directly outputs the audio data received from the base station 2a to the audio data selecting portion 62a. When the audio data selecting portion 62 has received the notification that the attributes of audio data of the mobile terminal 1a on the calling side match the attributes of audio data of the audio terminal 1b on the called side from the call connection controlling portion 42a, the audio data selecting portion 62 selects the audio data to which the audio attribute information has been added to the audio data received from the base station 2a (namely, the audio data that has not been code-converted by the CODEC 41a). Thereafter, the audio data selecting portion 62 outputs the selected audio data to the mobile-terminal switching station 5. When the audio data selecting portion 62a has not received the notification from the call connection controlling portion 42a, the audio data selecting portion 62a selects the audio data that has been code-converted into PCM audio data by the CODEC 41a and outputs the PCM audio data to the mobile-terminal switching station 5.

Next, the operation of the base-station controlling unit 3b on the called side will be described. Audio data received from the mobile-terminal switching station 5 is sent to both the CODEC 41b and the audio data type determining portion 61b of the downbound signal processing portion 31b. The CODEC 41b code-converts audio data received from the mobile-terminal switching station 5 into audio data with the attributes common to all mobile terminals 1b on the called side.

The audio data type determining portion 61b determines whether or not audio attribute information has been added to audio data received from the base-station controlling unit 3a through the mobile-terminal switching station 5. When audio attribute information has been added to audio data, the audio data type determining portion 61b causes the audio data selecting portion 62b to select audio data that has not been code-converted by the CODEC 41b and to output the selected audio data to the base station 2b. When audio attribute information has not been added to audio data, the audio data type determining portion 61b causes the audio data selecting portion 62b to select audio data that has been code-converted by the CODEC 41b and to output the selected audio data to the base station 2b.

Next, with reference to FIG. 2, a first example of the call connecting sequence of the CODEC-through system according to the embodiment of the present invention will be described. When the mobile terminal 1a calls the mobile terminal 1b, the mobile terminal 1a transmits a call connection request (SET UP) to the mobile-terminal switching station 5 through the base station 2a and the base-station controlling unit 3a. When the mobile-terminal switching station 5 has received the call connection request (SET UP), the mobile-terminal switching station 5 transmits a call (PAG REQUEST) to a plurality of base-station controlling units. Thus, the mobile-terminal switching station 5 also transmits the call (PAG REQUEST) to the base-station controlling unit 3b. The mobile terminal 1b that has received a call (PAG MESSAGE) from the mobile-terminal switching station 5 sends back a response (AUTH RES) to the mobile-terminal switching station 5.

In the process, the mobile-terminal switching station 5 identifies the attributes of audio data of the mobile terminal 1a corresponding to CODEC INF included in the call connection request (SET UP). In addition, the mobile-terminal switching station 5 identifies the attributes of audio data of the mobile terminal 1b corresponding to CODEC INF included in the response (AUTH RES) received from the mobile terminal 1b through the base-station controlling unit 3b. When the attributes of audio data of the mobile terminal 1a match the attributes of audio data of the mobile terminal 1b, after the mobile-terminal switching station 5 performs a certificating process and a channel-allocating process, the mobile-terminal switching station 5 transmits a response (ALERT) to the base-station controlling.unit 3a and thqn a command (CODEC REQ) for prohibiting transmission code-converted audio to the base-station controlling unit 3a.

When the base-station controlling unit 3a has received the command (CODEC REQ), the base-station controlling unit 3a sends back a response (CODEC RES) that represents an acknowledgment of the command (CODEC REQ) to the mobile-terminal switching station 5. After the mobile-terminal switching station 5 has received the response command (CODEC RES), the mobile-terminal switching station 5 performs the conventional call connecting process so that the mobile terminals 1a and 1b communicate with each other. After both the mobile terminals 1a and 1b have communicated with each other, the base-station controlling unit 3a on the calling side adds audio attribute information to audio data that has not been code-converted in the process shown in FIG. 1 and outputs the resultant audio data to the mobile-terminal switching station 5.

The base-station controlling unit 3b on the called side identifies audio attribute information (that has been added to audio data being communicated) by the base-station controlling unit 3a on the calling side. Thereafter, in the process shown in FIG. 1, the base-station controlling unit 3b on the called side autonomously selects audio data that has not been code-converted and outputs the selected audio data to the base station 2b. After the call connecting process is completed and a communication is started, the base-station controlling unit 3a adds audio attribute information to the audio data that is being communicated. In addition, the base-station controlling unit 3b always identifies the audio attribute information. Thus, a communication can be made without the code-converting process.

Next, with reference to FIGS. 1 and 3, a second example of the call connecting sequence of the CODEC-through system according to the embodiment of the present invention will be described. In the first example, which the mobile-terminal switching station 5 prohibits the base-station controlling unit 3a on the calling side from transmitting the code-.

Figure 3:
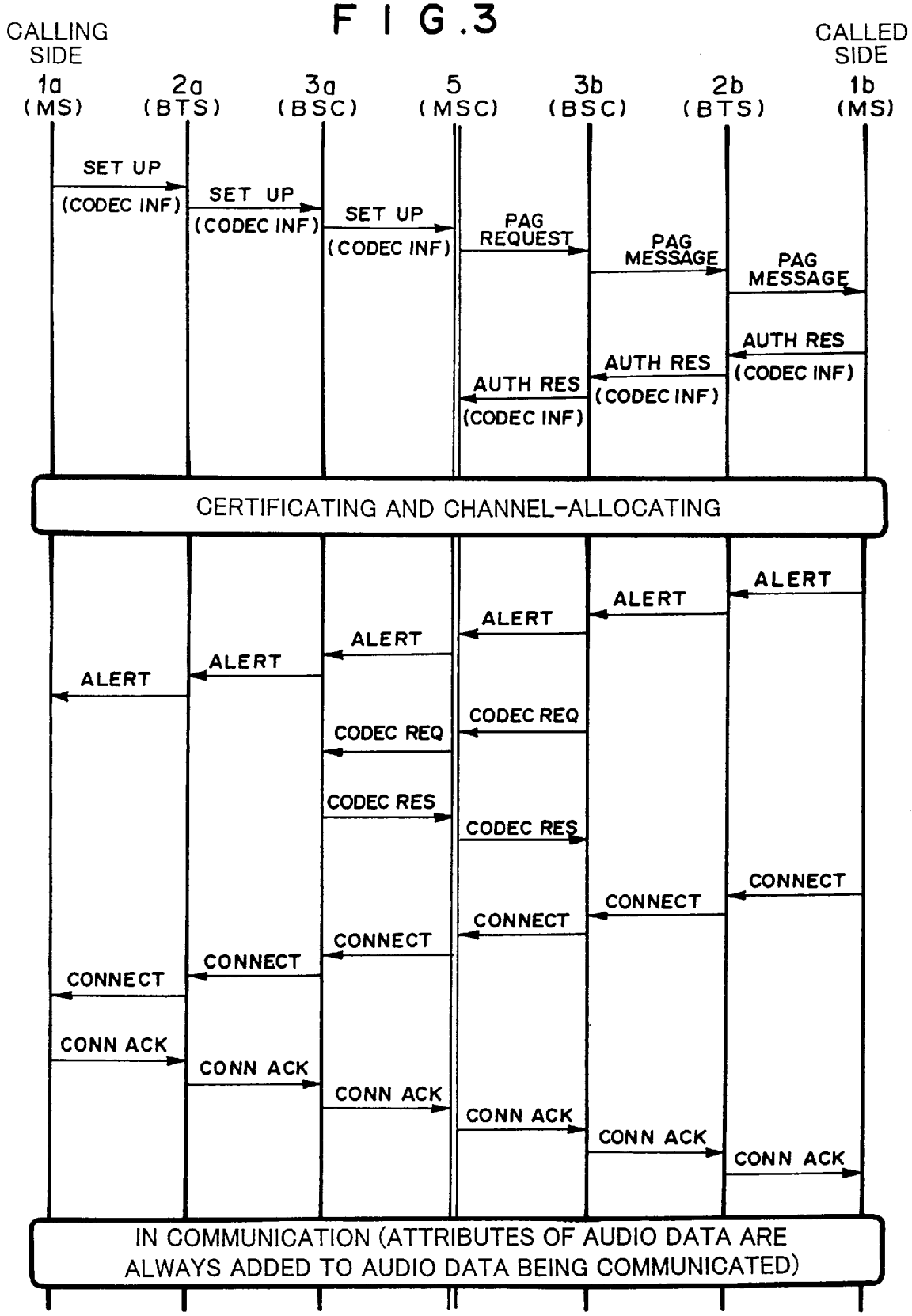
FIG. 3 is a schematic diagram showing a second example of the call connecting sequence according to the present invention.

In the second example, with reference to FIG. 3, the base-station controlling unit 3b on the called side prohibits the base-station controlling unit 3a on the calling side When the mobile terminal 1a calls the mobile terminal 1b, the mobile-terminal switching station 5 adds CODEC INF included in the call connection request (SET UP) to the command (PAG REQUEST) that is transmitted to each base-station controlling unit.

The call connection controlling portion 42b of the base-station controlling unit 3b of a plurality of base-station controlling units identifies the attributes of audio data of the mobile terminal 1a corresponding to the CODEC INF included in the command (PAG REQUEST). In addition, the call connection controlling portion 42b identifies the attributes of audio data of the mobile terminal 1b corresponding to CODEC INF included in the response (AUTH RES) received from the mobile terminal 1b through the base-station controlling unit 3b.

When the attributes of audio data of the mobile terminal 1a match the attributes of audio data of the mobile terminal 1b, after the call connection controlling portion 42b performs a certificating process and a channel-allocating process, the call connection controlling portion 42b issues a command (CODEC REQ) for prohibiting transmission of code-converted voice signal to the base-station controlling unit 3a on the calling side through the mobile-terminal switching station 5. The connection controlling portion 42a of the base-station controlling unit 3a receives the command (CODEC REQ).

When the call connection controlling portion 42a has received the command (CODEC,REQ), the call connection controlling portion 42a transmits a response (CODEC RES) to the command (CODEC REQ) to the base-station controlling unit 3b on the called side through the mobile-terminal switching station 5. Thereafter, the call connection controlling portion 42a causes the adding portion 62a to add audio attribute information to the audio data. In addition, the call connection controlling portion 42a causes the audio data selecting portion 62a to select audio data that has not been code-converted by the CODEC 41a and to output the selected audio data.

When the call connection controlling portion 42b has received the response (CODEC RES), the call connection controlling portion 42b causes the audio data selecting portion 62b to select audio data that has not been code-converted by the CODEC 41b and to output the selected audio data. After the call connecting process is completed and a communication is started, the base-station controlling unit 3a adds audio attribute information to audio data being communicated. In addition, the base-station controlling unit 3b always identifies the audio attribute information. Thus, a communication can be made without the code-converting process.

Figure 4:
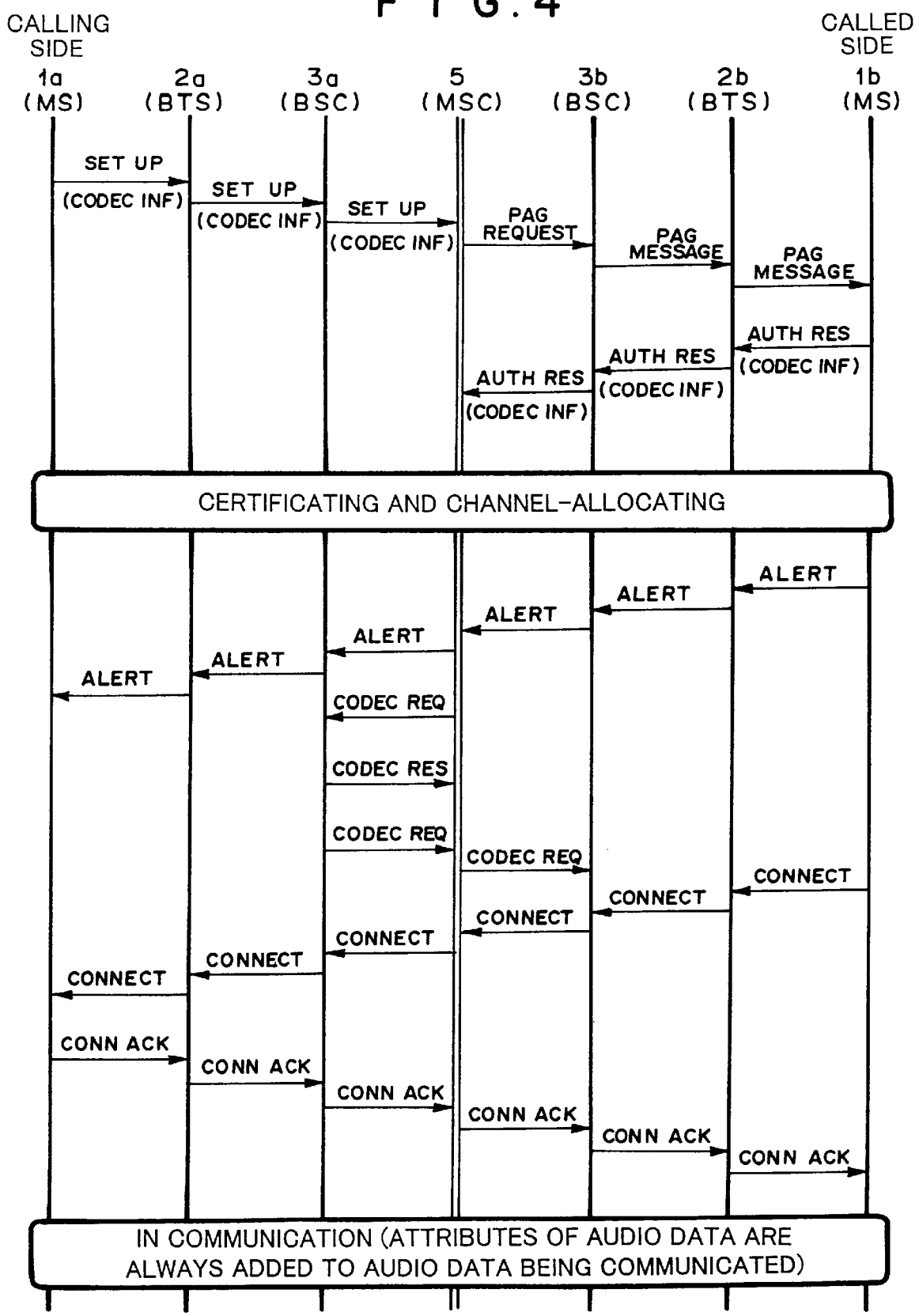
FIG. 4 is a schematic diagram showing a third example of the call connecting sequence according to the present invention.
Figure 5:
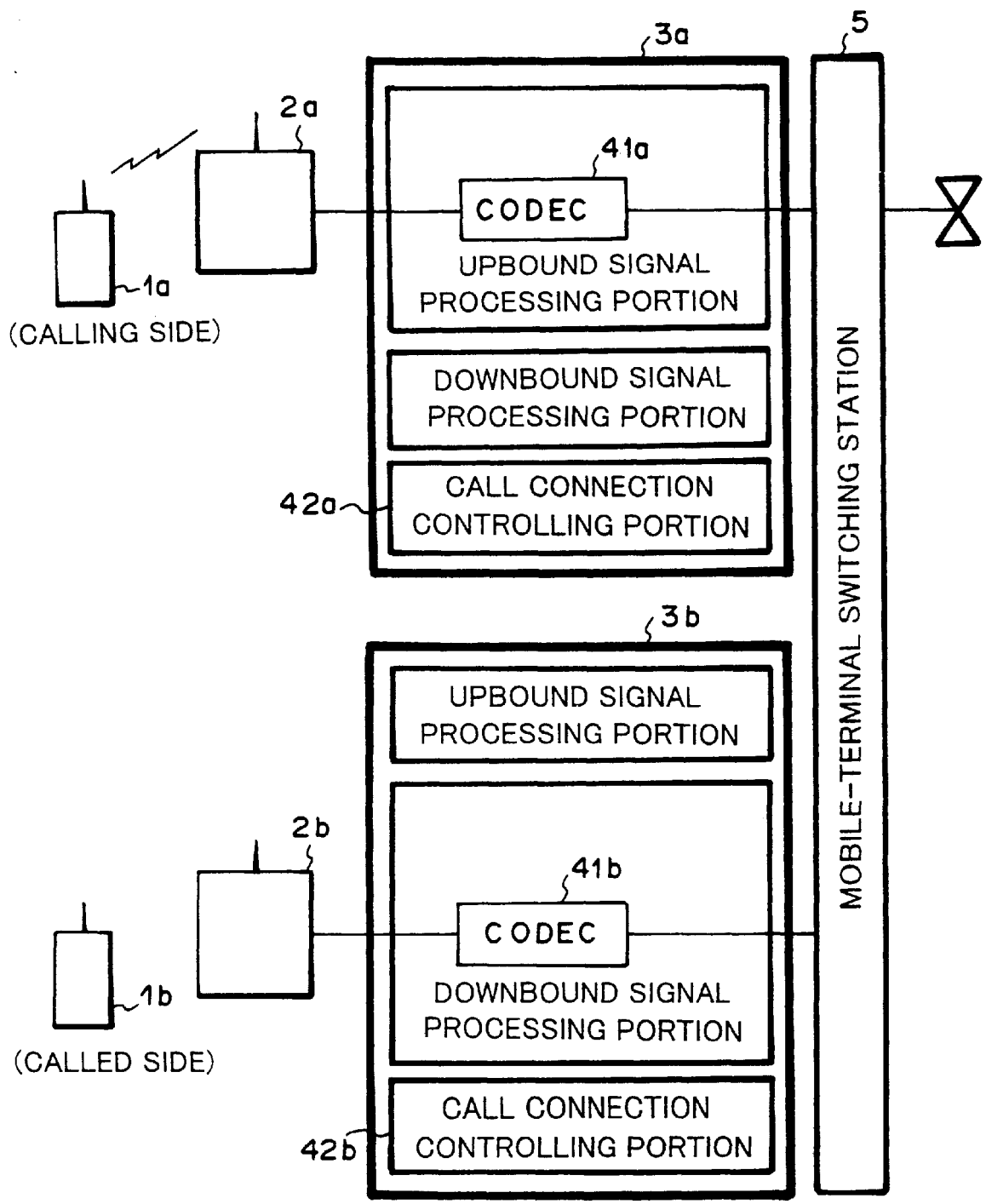
FIG. 5 is a block diagram showing the structure of a related art reference.

Next, with reference to FIGS. 1 and 4, a third example of the call connecting sequence of the CODEC-through system according to the embodiment will be described. In the second example, the base-station controlling unit 3b on the called side identifies audio attribute information added to audio data being communicated and thereby autonomously determines whether or not the code-converting process is required without need for intervention by the mobile-terminal switching station 5 and the base-station controlling unit 3a.

In the third example, the base-station controlling unit 3b on the called side determines whether or not the code-converting process is required corresponding to a command received from the base-station controlling unit 3a in the call connection process. The mobile-terminal switching station 5 identifies the attributes of audio data of the mobile terminal 1a corresponding to CODEC INF included in the call connection request (SET UP). In addition, the mobile-terminal switching station 5 identifies the attributes of audio data of the mobile terminal 1b corresponding to CODEC INF included in the response (AUTH RES) received from the mobile terminal 1b through the base-station controlling unit 3b.

When the attributes of audio data of the mobile terminal 1a match the attributes of audio data of the mobile terminal 1b, after the mobile-terminal switching station 5 performs a certificating process and a channel-allocating process, the mobile-terminal switching station 5 transmits the response (ALERT) to the base-station controlling unit 3a. Thereafter, the mobile-terminal switching station 5 issues the command (CODEC REQ) for prohibiting transmission of code-converted audio to the base-station controlling unit 3a.

When the base-station controlling unit 3a has received the command (CODEC REQ), the base-station controlling unit 3a sends back the response (CODEC RES) that represents an acknowledgment of the command (CODEC REQ) to the mobile-terminal switching station 5. Thereafter, the base-station controlling unit 3a transmits the command (CODEC REQ) for prohibiting transmission of code-converted audio to the base-sation controlling unit 3b through the mobile-terminal switching station 5. The call connection controlling portion 42b of the base-station controlling unit 3b receives the command (CODEC REQ).

When the call connection controlling portion 42b has received the command (CODEC REQ), the call connection controlling portion 42b causes the selecting portion 62b to select audio data that has not been code-converted by CODEC 41b and to output the selected audio data to the base station 2b. After the call connecting process is completed and a communication is started, the base-station controlling unit 3a adds audio attribute information to audio data that is being communicated. The base-station controlling unit 3b always identifies the audio attribute information. Thus, a communication can be made without the code-converting process.

Next, with reference to FIG. 1, the structure and operation of an audio monitor unit according to an embodiment of the present invention will be described. The audio monitor unit 8 comprised of a first signal patch 9 including an audio data type determining portion 9b, an audio data selecting portion 9c, and the CODEC 9a. Audio monitor unit 8 is also comprised of a second signal path 10 including a CODEC 10a, an audio data type determining portion 10b and an audio data selecting portion 10c. Signal paths 9 and 10 each to monitor audio data received from one of the mobile terminals 1a and 1b that are in communication regardless of the attributes of the audio data. For example signal path 9 monitors audio data from calling-side terminal 1a, and signal path 10 monitors audio data from called-side mobile terminal 1b. As previously explained, if the attributes of the calling terminal 1a match the attributes of terminal 1b, the mobile-terminal switching station 5 receives audio data that has not been code-converted into PCM audio data. To monitor such audio data, it is necessary to determine the attributes of audio data that is being communicated and code-convert the audio data in accordance with its attributes into PCM audio data.

As shown in FIG. 1, the audio data type determining portions 9b and 10d respectively determine the attributes of audio data of the mobile terminals 1a and 1b. When audio attribute information has teen added to audio data, the determining portions 9b and 10b cause the attribute audio data selecting portions 9c and 10c to select audio data that has been code-converted to PCM audio CODEC 9a and CODEC 10a, and to output the selected audio data on adder 11. When audio attribute information has not been added to audio data, the audio data will be in PCM form, and further code conversion is not needed. Thus, the determining portions 9b and 10b causes the audio data selecting portions 9c and 10c to select audio data that has not been code-converted by the CODECS 9a and 10a and to output the selected audio data to adder 11. Thus, audio data that is output from the audio data selecting portions 9c and 10c are always PCM audio data.

The adding portion 11 digitally adds both the audio data and sends the resultant audio data to the audio data outputting portion 12. The audio data outputting portion 12 decodes the PCM audio data, amplifies the resultant audio data, and outputs the resultant audio data as a sound. Thus, the audio monitoring unit 8 can monitor audio data of two communicating parties regardless of the attributes of the audio data without need to receive a command from the mobile-terminal switching station 5.

According to the present invention, when mobile terminals having the same attributes of audio data communicate with each other, since it is not necessary to perform the code-converting process (unlike with the conventional system that requires the code-converting process two times), the delay time of audio data can be decreased. In addition, the quality of audio data can be prevented from deteriorating.

In addition, according to the present invention, since a base-station controlling unit on the calling side has a means for prohibiting transmission of code-converted audio to a base-station controlling unit on the called side and a means for identifying audio attribute information added to audio data, the base-station controlling unit on the calling side can autonomously determine whether or not the code-converting process is required without interventions of a mobile-terminal switching station and the base-station controlling unit on the called side. Thus, the above-described effects can be accomplished in a simpler call connecting sequence than before.

Moreover, according to the present invention, an audio monitor unit has a means for identifying audio attribute information added to audio data and a means for determining whether or not the code-converting process is required corresponding to the identified results, the audio monitor unit can monitor audio data of two parties that are communicating with each other regardless of the attributes of the audio data thereof.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A mobile communication system including:
   a plurality of mobile terminals, each capable of initiating and receiving calls;
   each terminal including means for transmitting coding attribute information as part of a call initiation process;
   means for determining if the coding attribute information transmitted by a calling terminal which is initiating a call matches the coding attribute information transmitted by the called terminal which is the intended recipient of the call;
   a first code conversion device that continuously processes an incoming audio data signal transmitted by the calling terminal to generate a first coded audio data signal;
   an adding circuit that produces an augmented audio data signal by adding coding attribute information to the audio data signal;
   a first switching device which selects the augmented audio data signal for transmission to the called terminal without processing by the first code conversion device if the coding attribute of the calling terminal matches the coding attribute of the called terminal, and selects the first coded audio data signal for transmission to the called terminal if the coding attribute of the calling terminal does not match the coding attribute of the called terminal;
   a second code conversion device that continuously processes the audio signal transmitted to the called terminal to generate a second coded audio data signal;
   a detecting circuit which is responsive to the presence of coding attribute information added to the audio signal transmitted to the called terminal; and
   a second switching device which is operative in response to the output of the detecting circuit indicating the presence of coding attribute information to select the audio data signal from the calling terminal for transmission directly to the called terminal without processing by the second code conversion device and responsive to the detecting circuit indicating the absence of coding attribute information to couple the second coded audio data signal for transmission to the called terminal.

2. The mobile communication system as set forth in claim 1, further including:
   a first base station and a first base-station controlling unit associated with the calling terminal;
   a first circuit which generates a control signal indicating if the coding attribute for the calling terminal matches the coding attribute for the called terminal; and
   a second circuit which transmits the control signal to the first base-station controlling unit;
   the first base-station controlling unit including the first code conversion device, the adding circuit and the first switching device;
   the first switching device being responsive to the control signal to select the augmented audio data signal or the first coded audio data signal for transmission to the called terminal.

3. The mobile communication system as set forth in claim 2, further including:
   a central switching station, the central switching station being comprised of:
   the comparison means; and
   a call initiation processor including the control signal generating circuit and the control signal transmitting circuit,
   the call initiation processor being operative to receive a call-initiation signal from the calling terminal, to transmit a paging signal addressed to the called terminal, and to receive a confirmation signal including coding attribute identifying information for the called terminal.

4. The mobile communication system as set forth in claim 2, further including:
   a second base station and a second base station controlling unit associated with the called terminal; and
   a central switching station, the second base station controlling unit including:
   the comparison means, the control signal generating circuit and the control signal transmitting circuit, the central switching station including:
   a call initiation signal processor which receives a call-initiation signal from the calling terminal, transmits a paging signal including coding attribute information for the calling terminal addressed to the called terminal, receives the control signal transmitted by the second base station controlling unit and transmits the control signal to the first base station.

5. The mobile communication system as set forth in claim 2, further including:
   a second base station and a second base station controlling unit associated with the called terminal; and
   a central switching station, the central switching station being comprised of:

the comparison means; and a call initiation signal processor which receives a call-initiation signal from the calling terminal, transmits a paging signal addressed to the called terminal, receives a confirmation signal including coding attribute identifying information for the called terminal and generates and transmits the control signal to the first base station controlling unit, the first base station controlling unit being further comprised of a third circuit that retransmits the control signal received from the central switching station to the second base station controlling unit, the second base station controlling unit including:
the second code conversion device;
the detecting circuit; and
the second switching device, the second switching device being operative in responsive to the control signal retransmitted from the first base station controlling unit.

6. The mobile communication system as set forth in claim 1, further including:

a first base station and a first base station controlling unit associated with the calling terminal;

a second base station and a second base station controlling unit associated with the called terminal;

the second base station controlling unit including the coding attributes identifying means; and further including:
a first circuit which generates a control signal indicating if the coding attribute for the calling terminal matches the coding attribute of the called terminal; and
a second circuit which transmits the control signal to the first base-station controlling unit.

7. The mobile communication system as set forth in claim 1, further including an audio monitor unit which audibly monitors audio data transmitted between the calling terminal and the called terminal.

8. The mobile communication system as set forth in claim 7, wherein the audio monitor unit is comprised of:

means for detecting the presence of coding attribute information in audio signals being transmitted between the calling terminal and the called terminal;

a third code-conversion circuit which performs a further code-conversion process on the audio signals transmitted between the calling and the called terminals;

a third switching device which selects the audio signals transmitted from the calling and the called terminals without the further code conversion or the audio signals on which the further code conversion has been performed in accordance with whether or not coding attribute information has been detected in the in the audio signals transmitted between the called terminal and the called terminal; and an audio conversion device which converts the selected signals into a composite audible signal.

9. The mobile communication system as set forth in claim 7, wherein:

the further code-conversion process creates PCM signals, and wherein the PCM signals are selected for conversion to the audible signal if coding attribute information has been detected in the audio signals transmitted between the calling terminal and the called terminal.

10. The mobile communication system as set forth in claim 7, wherein the means for detecting the presence of coding attribute information in audio signals being transmitted between the calling terminal and the called terminal further including a circuit which identifies the specific coding attribute being transmitted, the further code conversion process being performed in accordance with the specific identified coding attribute identified.

11. The mobile communication system as set forth in claim 8, further including:

a central switching station, the central switching station being comprised of:
the comparison means; and
a call initiation processor including:
a first circuit which generates a control signal indicating if the coding attribute for the calling terminal matches the coding attribute of the called terminal;
a second circuit which transmits the control signal to the first switching device;
the call initiation processor being operative to receive a call-initiation signal from the calling terminal to transmit a paging signal addressed to the called terminal, and to receive a confirmation signal including coding attribute identifying information for the called terminal,
the first switching device being responsive to the control signal to select the augmented audio data signal or the first coded audio data signal for transmission to the called terminal.

12. A method of establishing communication between a calling terminal and a called terminal in a mobile communication system comprising the steps of:

transmitting a call initiating signal from the calling terminal, the call initiating signal including the identity of the calling terminal, coding attribute information for the calling terminal and the identity of the called terminal;

transmitting a paging signal which identifies the called terminal;

transmitting a confirmation signal from the called terminal to an associated base station upon receipt of the paging signal, the confirmation signal including coding attribute information for the called terminal;

comparing the coding attribute information for the called terminal and the coding attribute information for the called terminal;

transmitting an audio data signal from the called terminal to an associated base station; at the base station associated with the called terminal:
generating a code-converted audio signal by performing a first code conversion process on the audio data signal; and
if the coding attributes of the called terminal match the coding attributes of the called terminal, augmenting the audio data signal by adding coding attribute identifying information thereto, and transmitting the augmented audio data signal to the base station associated with the called terminal, or
if the coding attributes of the called terminal do not match the coding attributes of the called terminal, transmitting the code-converted audio signal to the base station associated with the called terminal; and
at the base station associated with the called terminal:
detecting whether or not the coding attribute of the called terminal matches that of the called terminal;
generating a decoded audio signal by performing a second code conversion process on the audio signal received from the called terminal; and if the coding attribute of the called terminal matches that of the called terminal, selecting the incoming audio signal as received from called terminal for transmission to the called terminal; or if the coding attribute of the called terminal does not match that of the called terminal, detected, selecting the decoded audio signal for transmission to the called terminal.

13. The method described in claim 12, wherein:

the call initiating signal is sent from the calling terminal to a central switching station;

the paging signal is sent from the central switching station;

the confirmation signal is sent to the central switching station; and the comparison of coding attribute information for the calling and the called terminals is performed at the central switching station; and further including the step of transmitting a control signal from the central switching station to the base station associated with the calling terminal indicating whether or not the coding attribute information for the called terminal matches that of the called terminal.

14. The method described in claim 12, wherein:

the call initiating signal is sent to a central switching station; and the paging signal is sent from the central switching station to the base station associated with the called terminal; and further including the steps of:

at the central switching station, adding coding attribute identifying information for the calling terminal to the paging signal, the comparison of coding attribute information for the calling and the called terminals being performed at the base station associated with the called terminal; and transmitting a control signal indicating whether or not the coding attribute information for the calling terminal matches that of the called terminal from the base station associated with the called terminal to the base station associated with the calling terminal.

15. The method described in claim 12, wherein:

the call initiating signal is sent from the calling terminal to a central switching station;

the paging signal is sent from the central switching station;

the confirmation signal is sent to the central switching station; and the comparison of coding attribute information for the calling and the called terminals is performed at the central switching station; and further including the steps of:

transmitting a control signal indicating whether or not the coding attribute information for the calling terminal matches that of the calling terminal from the central switching station to the base station associated with the called terminal; and thereafter, if the coding attribute information for the called terminal matches that of the called terminal, re-transmitting the control signal from the base station associated with the calling terminal to the base station associated with the called terminal, the base station associated with the called terminal being responsive to the re-transmitted control signal to select the incoming audio signal as received from calling terminal for transmission to the called terminal.

16. The method described in claim 12, further including the steps of:

detecting the presence or absence of the coding attribute identifying information in the signal received from the calling terminal; and if the coding attribute identifying information is detected, selecting the audio signal as received from the calling terminal for transmission to the called terminal; or if the coding attribute identifying information is not detected, selecting the decoded audio signal for transmission to the called terminal.

17. The method of claim 12, further including the step of audibly monitoring the communication between the called terminal and the called terminal.

18. The method of claim 17, wherein the monitoring step including the steps of:

detecting the presence of coding attribute information in audio signals being transmitted between the called terminal and the called terminal;

performing a further code-conversion process on the audio signals transmitted from the called and the called terminals;

selecting the audio signals as transmitted from the calling and the called terminals without further code conversion or the audio signals transmitted on which the further code conversion has been performed in accordance with whether or not coding attribute information has been detected in the in the audio signals transmitted between the calling terminal and the called terminal; and converting the selected signals into an audible signal.

19. The method of claim 18, wherein the further code-conversion process creates PCM signals, and wherein the PCM signals are selected for conversion to the audible signal if coding attribute information has been detected in the in the audio signals transmitted between the called terminal and the called terminal.

20. The method of claim 18, further including the step of identifying the specific coding attribute information detected in the audio signals being transmitted between the called terminal and the called terminal, the further code conversion process being performed in accordance with the specific identified coding attribute.

* * * * *